(12) United States Patent
Shimizu (10) Patent No.: US 6,874,472 B2
(45) Date of Patent: Apr. 5, 2005

(54) IGNITION TIMING CONTROL APPARATUS FOR INTERNAL COMBUSTION ENGINE AND METHOD THEREOF

(75) Inventor: Hirokazu Shimizu, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 51 days.

(21) Appl. No.: 10/329,671

(22) Filed: Dec. 27, 2002

(65) Prior Publication Data

US 2003/0121500 A1 Jul. 3, 2003

(30) Foreign Application Priority Data

Dec. 28, 2001 (JP) ........................................ 2001-399619

(51) Int. Cl.⁷ ................................................ F02P 5/00
(52) U.S. Cl. ............................ 123/406.11; 123/406.65
(58) Field of Search ........................ 123/406.11, 406.45, 123/406.58, 90.15, 90.16, 90.17, 90.31

(56) References Cited

U.S. PATENT DOCUMENTS 5,685,276 A * 11/1997 Tanaka et al. .............. 123/478
6,196,197 B1 * 3/2001 Yamada et al. ............. 123/480
6,209,516 B1 * 4/2001 Yamashita .................. 123/305
6,325,047 B2 * 12/2001 Kawakami ............. 123/406.64
6,681,741 B2 * 1/2004 Majima et al. .............. 123/399

FOREIGN PATENT DOCUMENTS

| JP | 9-209895 A | 8/1997 |
| JP | 2001-221105 A | 8/2001 |

* cited by examiner

Primary Examiner—Mahmoud Gimie
(74) Attorney, Agent, or Firm—Foley & Lardner LLP (57) ABSTRACT

A controlled variable and a target in each of a variable valve event and lift control apparatus and a variable valve timing control apparatus are input, to calculate target opening timing of an intake valve corresponding to the target and also to calculate actual opening timing of the intake valve corresponding to the controlled variable, to correct ignition timing based on a deviation between the target opening timing and the actual opening timing.

17 Claims, 11 Drawing Sheets

IGNITION TIMING CONTROL APPARATUS FOR INTERNAL COMBUSTION ENGINE AND METHOD THEREOF

FIELD OF THE INVENTION

The present invention relates to an ignition timing control apparatus and an ignition timing control method in an internal combustion engine, in which valve timing and a valve lift of an intake valve are variably controlled.

RELATED ART OF THE INVENTION

Heretofore, in an internal combustion engine provided with a variable valve mechanism, there has been known a constitution wherein ignition timing is corrected according to a variation in valve timing of an intake valve.

Japanese Unexamined Patent Publication No. 2001-221105 discloses a constitution in which valve overlap is calculated based on target opening liming of an intake valve and target closing timing of an exhaust valve, and a cylinder residual exhaust gas amount is estimated based on the valve overlap, to correct ignition timing according to the cylinder residual exhaust gas amount.

Further, Japanese Unexamined Patent Publication No. 9-209895 discloses a constitution in which basic ignition timing is corrected according to a deviation between actual valve timing and target valve timing of an intake valve.

However, in the constitution disclosed in Japanese Unexamined Patent Publication No. 2001-221105, there is a problem in that a correction that does not correspond to an actual valve overlap amount is performed on ignition timing, during a transition period wherein a deviation is caused between actual valve timing and target valve timing.

On the other hand, in the constitution disclosed in Japanese Unexamined Patent Publication No. 9-209895, ignition timing can be appropriately corrected corresponding to a transition state of valve timing.

However, the constitution disclosed in Japanese Unexamined Patent Publication No. 9-209895 is to be applied to an engine provided with only a variable valve timing mechanism, in which the actual valve timing is detected by detecting rotation phases of a crankshaft and a camshaft.

However, in the case where there is provided, together with a variable valve timing mechanism, a variable valve event and lift mechanism that varies continuously a valve lift with a valve event of an intake valve, even if the rotation phases of the crankshaft and camshaft are the same, valve timing of the intake valve is varied depending on a difference of valve lift.

Consequently, according to such a method as disclosed in Japanese Unexamined Patent Publication No. 9-209895, in the case of an engine provided with a variable valve timing mechanism and a variable valve event and lift mechanism, there is a problem in that since the deviation between the actual valve timing and the target valve timing cannot be detected, the ignition timing cannot be appropriately corrected.

SUMMARY OF THE INVENTION

It is therefore an object of the present invention to enable to appropriately correct ignition timing even in a transition period of valve timing and a valve lift of an intake valve, in an engine provided with a variable valve timing mechanism and a variable valve event and lift mechanism.

In order to accomplish the above-mentioned object, according to the present invention, a controlled variable and a target in each of variable valve event and lift control apparatus and variable valve timing control apparatus are input to calculate target opening timing of an intake valve corresponding to the target, and also actual opening timing of the intake valve corresponding to the controlled variable, to correct ignition timing based on a deviation between the target opening timing and the actual opening timing.

The other objects and features of the invention will become understood from the following description with reference to the accompanying drawings.

DESCRIPTION OF THE PREFERRED EMBODIMENT

Figure 1:
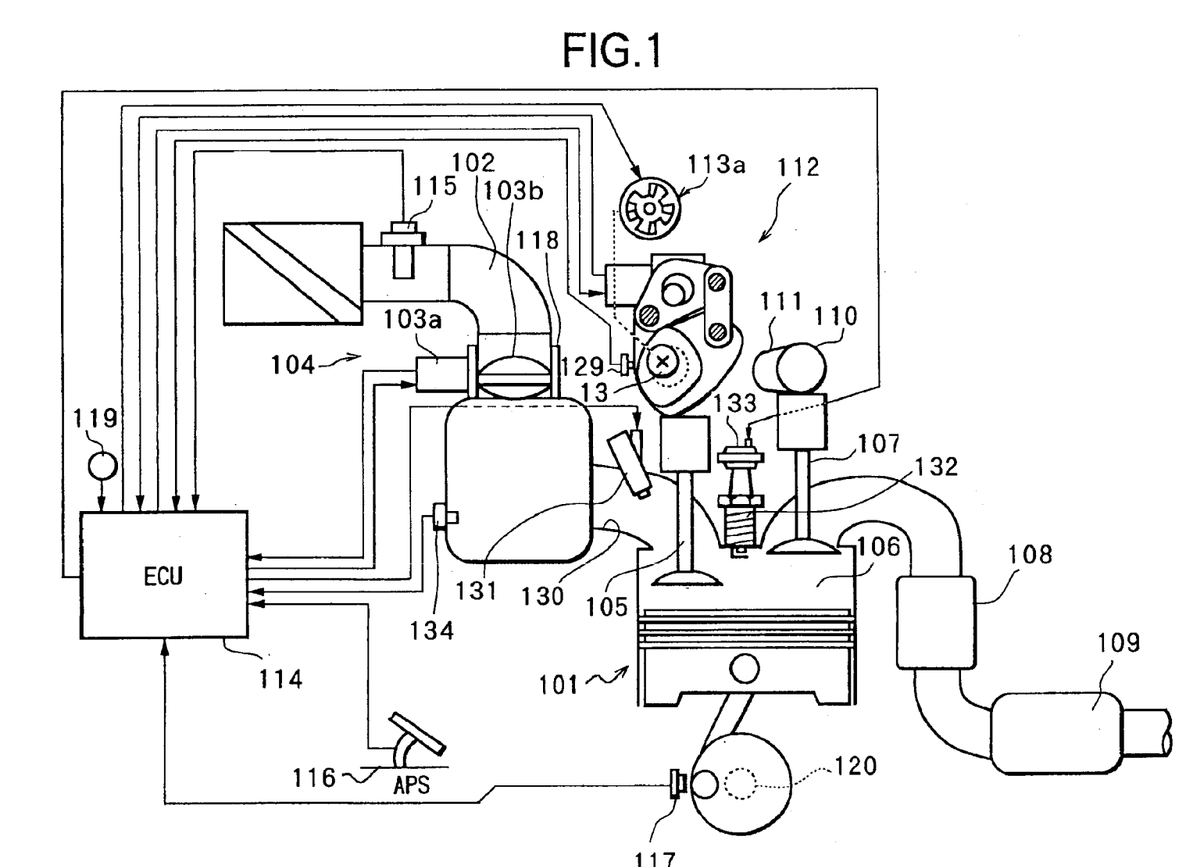
FIG. 1 is a diagram of a system structure of an internal combustion engine in an embodiment.

FIG. 1 is a structural diagram of an internal combustion engine for vehicle in an embodiment.

In FIG. 1, in an intake passage 102 of an internal combustion engine 101, an electronically controlled throttle 104 is dispose for driving a throttle valve 103b to open and close by a throttle motor 103a.

Air is sucked into a combustion chamber 106 via electronically controlled throttle 104 and an intake valve 105.

A combusted exhaust gas is discharged from combustion chamber 106 via an exhaust valve 107, purified by a front catalyst 108 and a rear catalyst 109, and then emitted into the atmosphere.

Exhaust valve 107 is driven to open and dose by a cam 111 axially supported by an exhaust side camshaft 110, at fixed valve lift, valve event and valve timing.

A valve lift and a valve event of intake valve 105 are varied continuously by a variable valve event and lift mechanism 112, and valve timing thereof is varied continuously by a variable valve timing mechanism 113.

An engine control unit 114 incorporating therein a microcomputer, controls electronically controlled throttle 104, variable valve event and lift mechanism 112 and variable valve timing mechanism 113, so that a target intake air amount corresponding to an accelerator opening can be obtained.

Engine control unit 114 receives various detection signals from an air flow meter 115 detecting an intake air amount Q of engine 101, an accelerator pedal sensor APS 116, a crank angle sensor 117 taking out a rotation signal from a crankshaft 120, a throttle sensor 118 detector an opening TVO of throttle valve 103b, a water temperature sensor 119 detecting a cooling water temperature Tw of engine 101, a cam sensor 129 detecting a reference angle position of an intake side camshaft 13, and an intake air pressure sensor 134 detecting an intake air pressure.

Engine control unit 114 calculates an engine rotation speed Ne based on the rotation signal output from crank angle sensor 117.

Further, an electromagnetic fuel injection valve 131 is disposed on an intake port 130 at the upstream side of intake valve 105 of each cylinder.

Fuel injection valve 131 injects fuel adjusted at a predetermined pressure toward intake vale 105, when driven to open by an injection pulse signal from engine control unit 114.

An air-fuel mixture formed inside each cylinder is ignited to burn by a spark ignition by an ignition plug 132.

Each ignition plug 132 is provided with an ignition coil 133 incorporating therein a power transistor. Engine control unit 114 switching controls the power transistor to control ignition timing (ignition advance value).

Ignition plug 132 and ignition coil 133 constitute an ignition apparatus.

Figure 2:
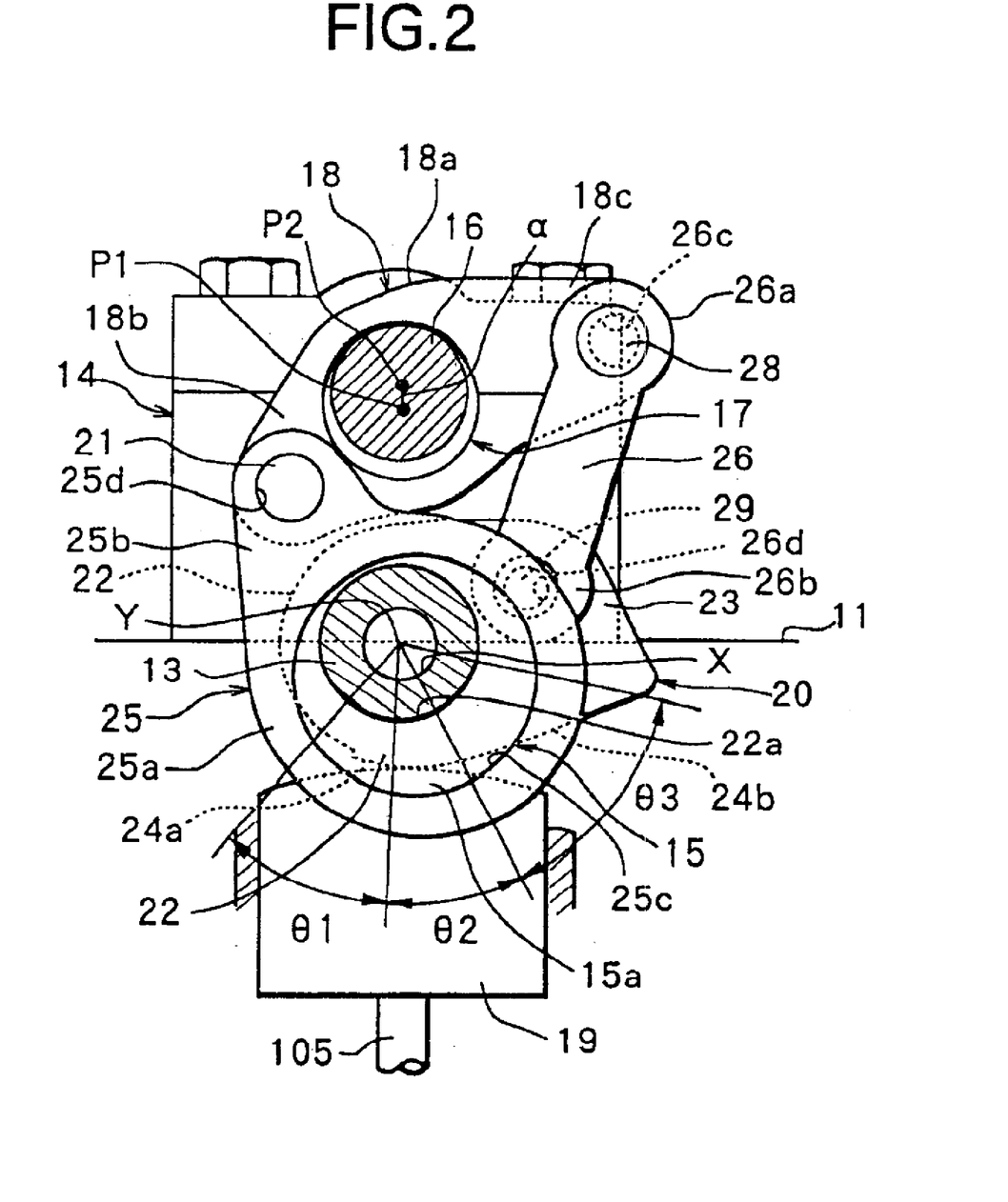
FIG. 2 is a cross section view showing a variable valve event and lift mechanism (A—A cross section of FIG. 3) in the embodiment.
Figure 3:
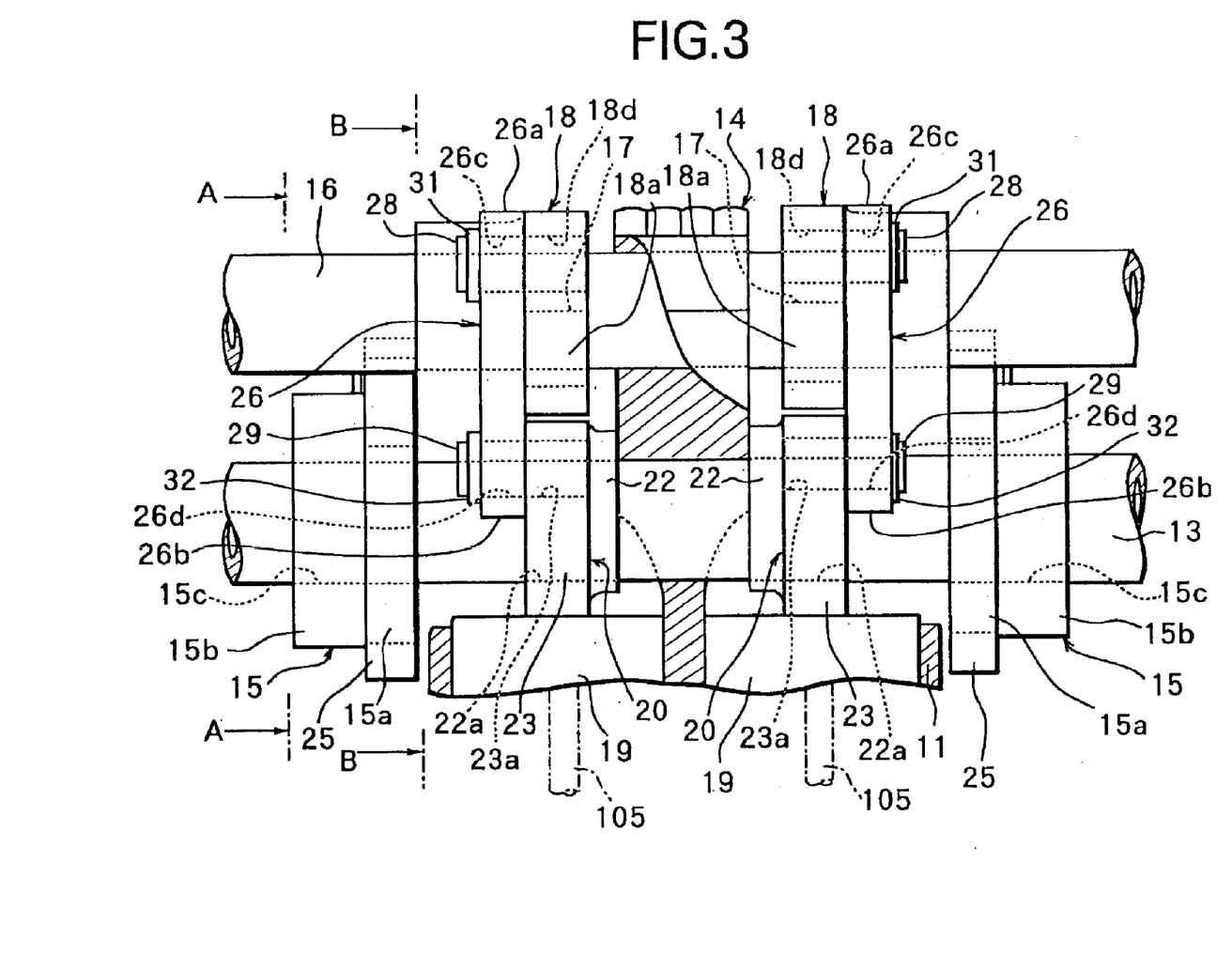
FIG. 3 is a side elevation view of the variable valve event and lift mechanism.
Figure 4:
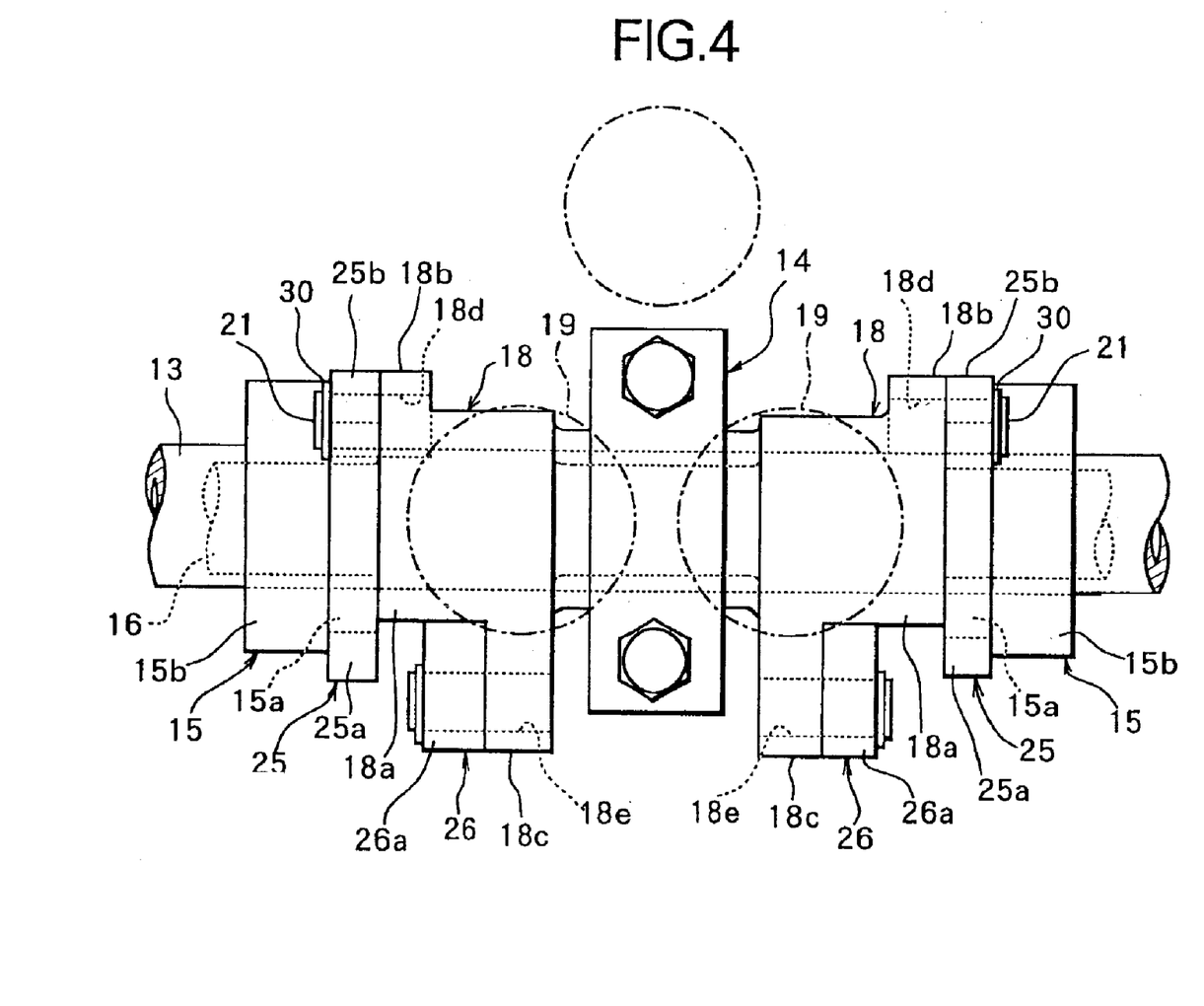
FIG. 4 is a top plan view of the variable valve event and lift mechanism.

FIG. 2 to FIG. 4 show in detail the structure of variable valve event and lift mechanism 112.

Variable valve event and lift mechanism 112 shown in FIG. 2 to FIG. 4 includes a pair of intake valves 105, 105, a hollow camshaft (drive shaft) 13 rotatably supported by a cam bearing 14 of a cylinder head 11, two eccentric cams (drive cams) 15, 15 as rotating cams axially supported by camshaft 13, a control shaft 16 rotatably supported by cam bearing 14 and arranged at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18,18 are connected with swing cams 20,20 by link members 26, 26.

Rocker arms 18, 18, link arms 25, 25, and link members 26, 26 constitute a transmission mechanism.

Figure 5:
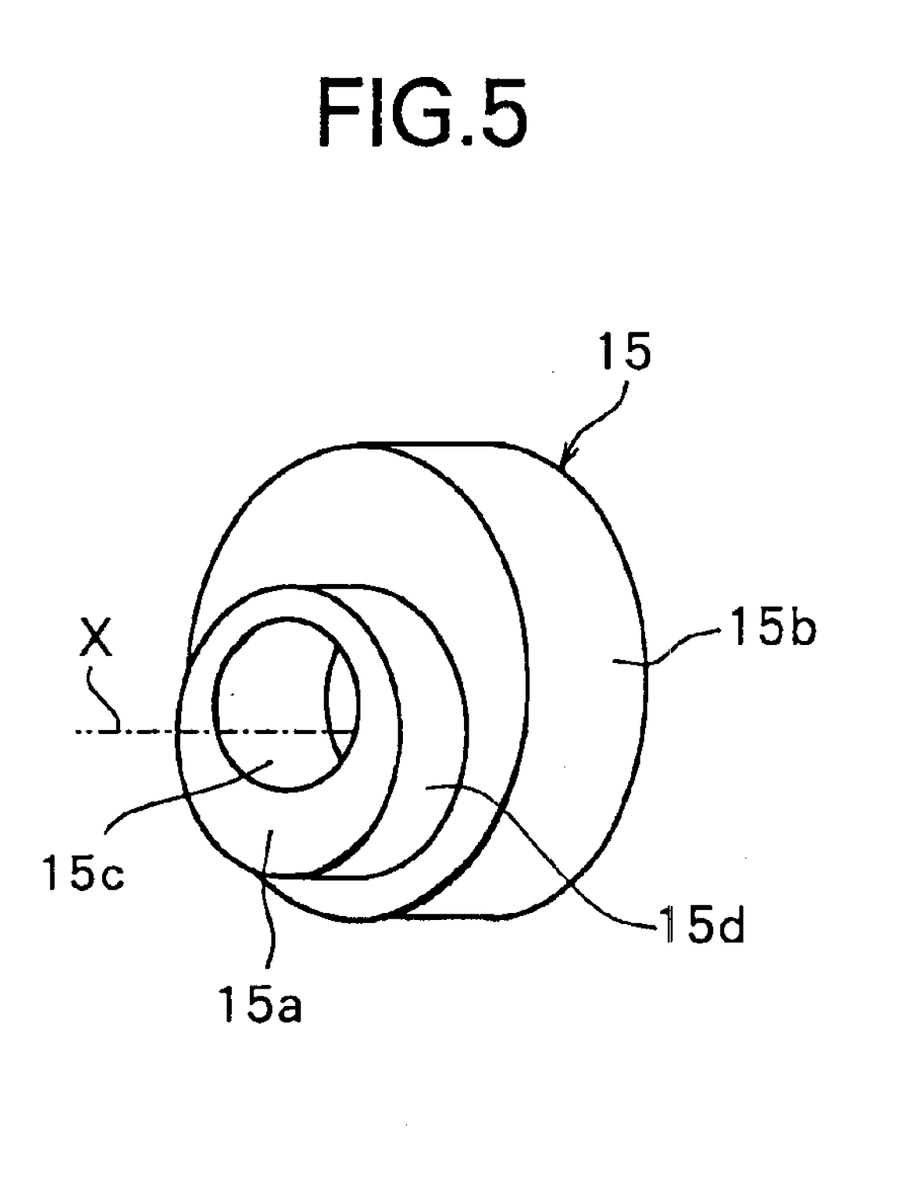
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outside positions that do not interfere with valve lifters 19, 19, respectively. Also, outer peripheral surfaces 15d, 15d of cam body 15a are formed in the same cam profile.

Each rocker arm 18, as shown in FIG. 4, is bent and formed in a substantially crank shape, and a central base portion 18a thereof is ratably supported by control cam 17.

A pin hole 18d is formed through one end portion 18b which is formed to protrude from an outer end portion of base portion 18a. A pin 21 to be connected with a tip portion of link arm 25 is pressed into pin hole 18d. On the other hand, a pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center a P2 position of control shaft 16 by α.

Figure 6:
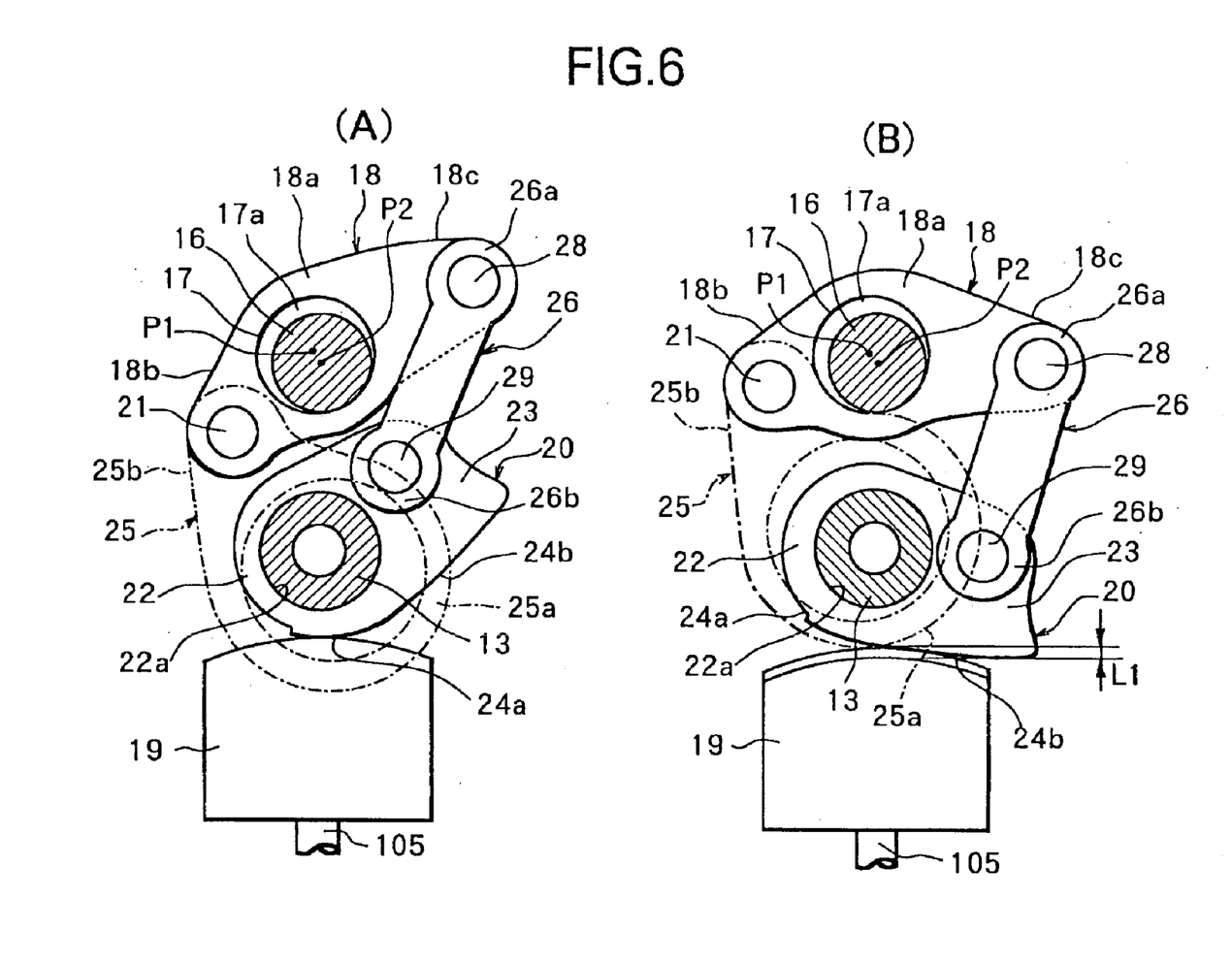
FIG. 6 is a cross section view showing a low lift condition by the variable valve event and lift mechanism (B—B cross section view of FIG. 3).
Figure 7:
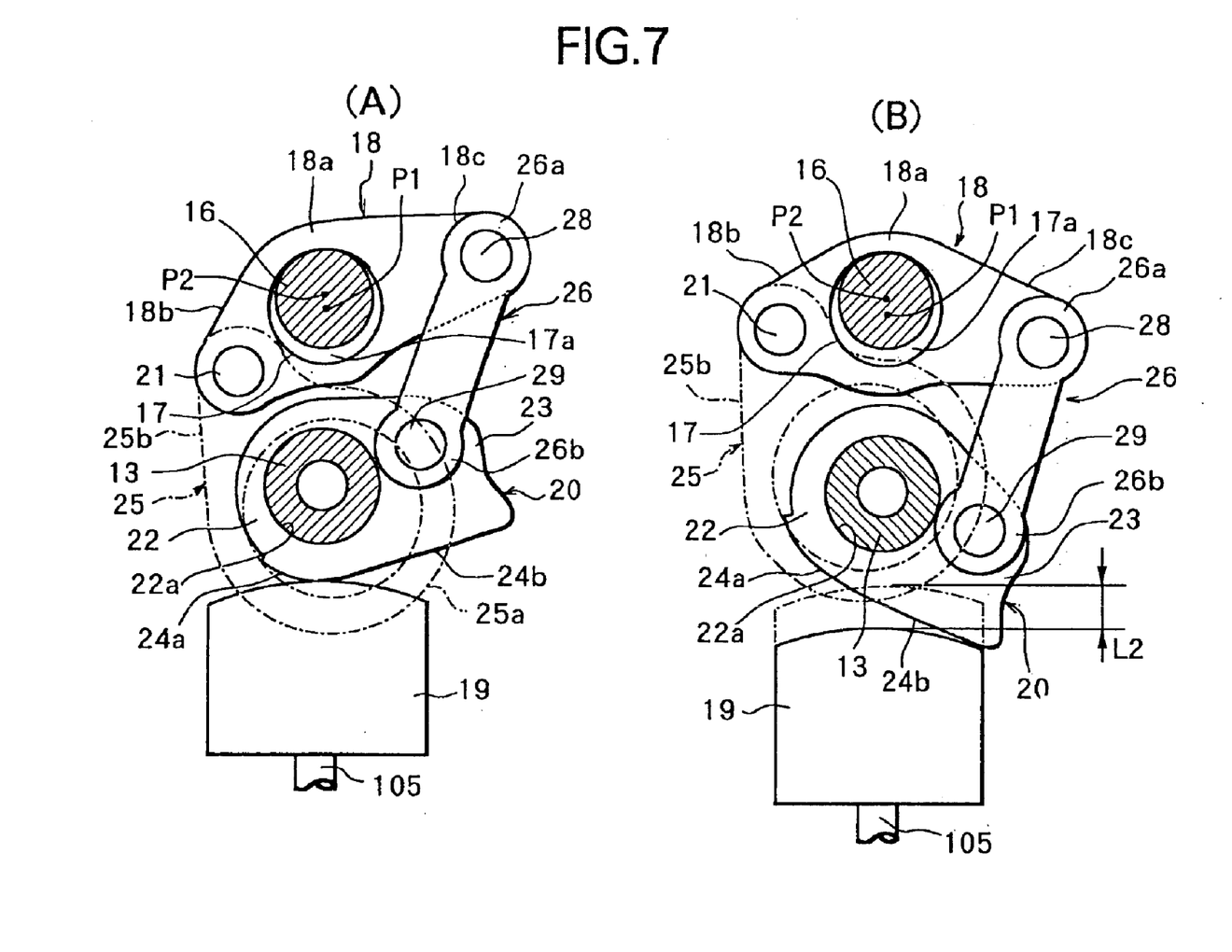
FIG. 7 is a cross section view showing a high lift condition by the variable valve event and lift mechanism (B—B cross eon view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 92 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
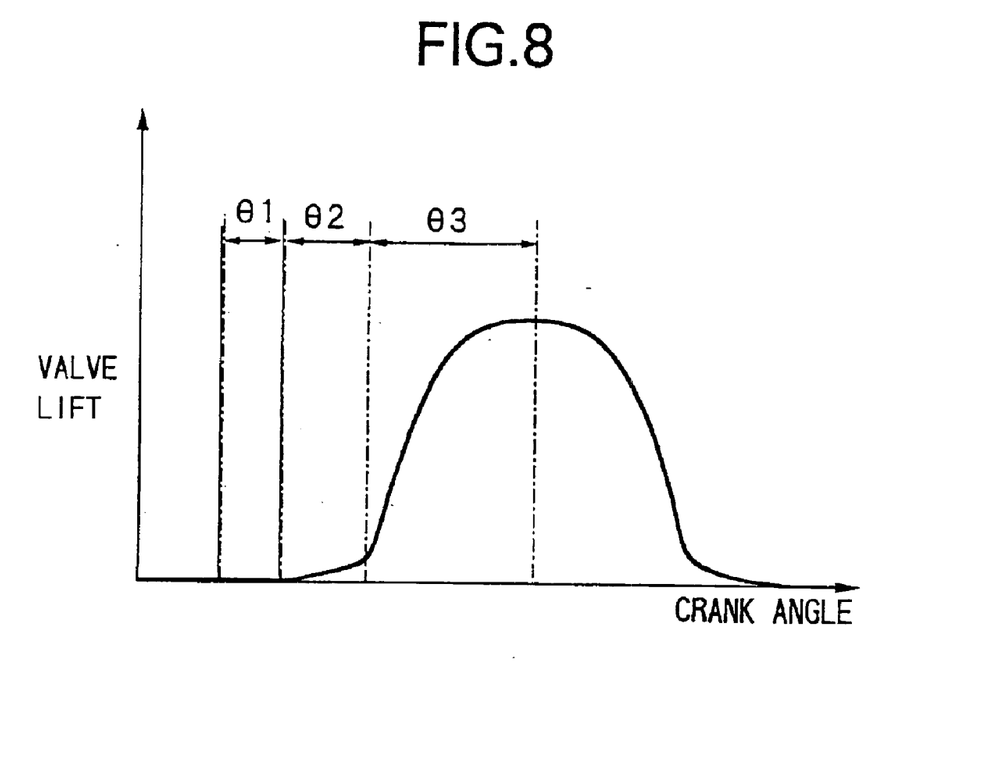
FIG. 8 is a characteristic diagram showing a correlation between an angle range of a cam surface, and a valve lift in the variable valve event and lift mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped be portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed an respective end portions of pins 21, 28, 29.

In such a constitution, depending on a positional relation between the center axis P2 of control shaft 16 and the center axis P1 of control cam 17, as shown in FIG. 6 and FIG. 7, the valve lift is varied, and by driving control shaft 16 to rotate, the position of the center axis P2 of control shaft 16 relative to the center axis P1 of control cam 17 is changed.

Figure 9:
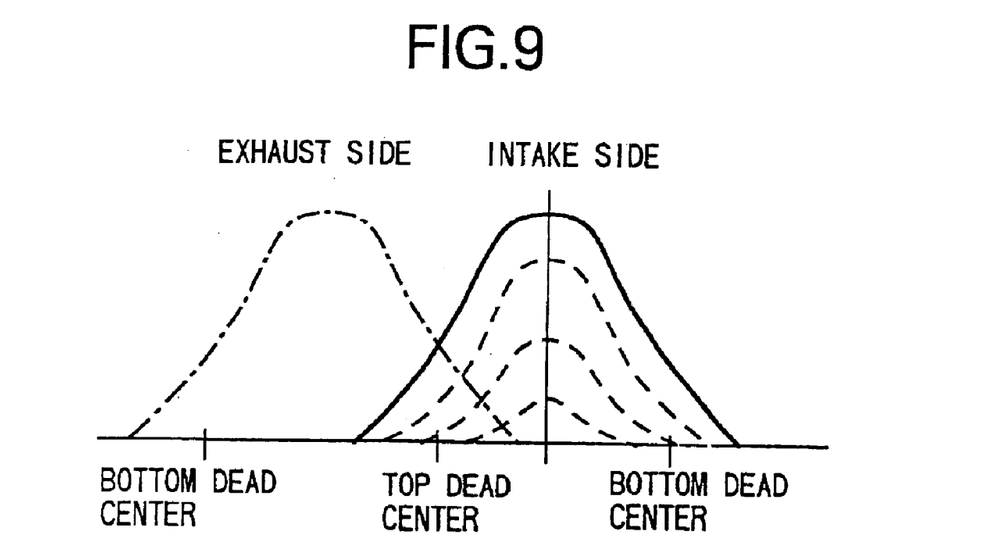
FIG. 9 is a characteristic diagram showing valve timing and the valve lift of the variable valve event and lift mechanism.
Figure 10:
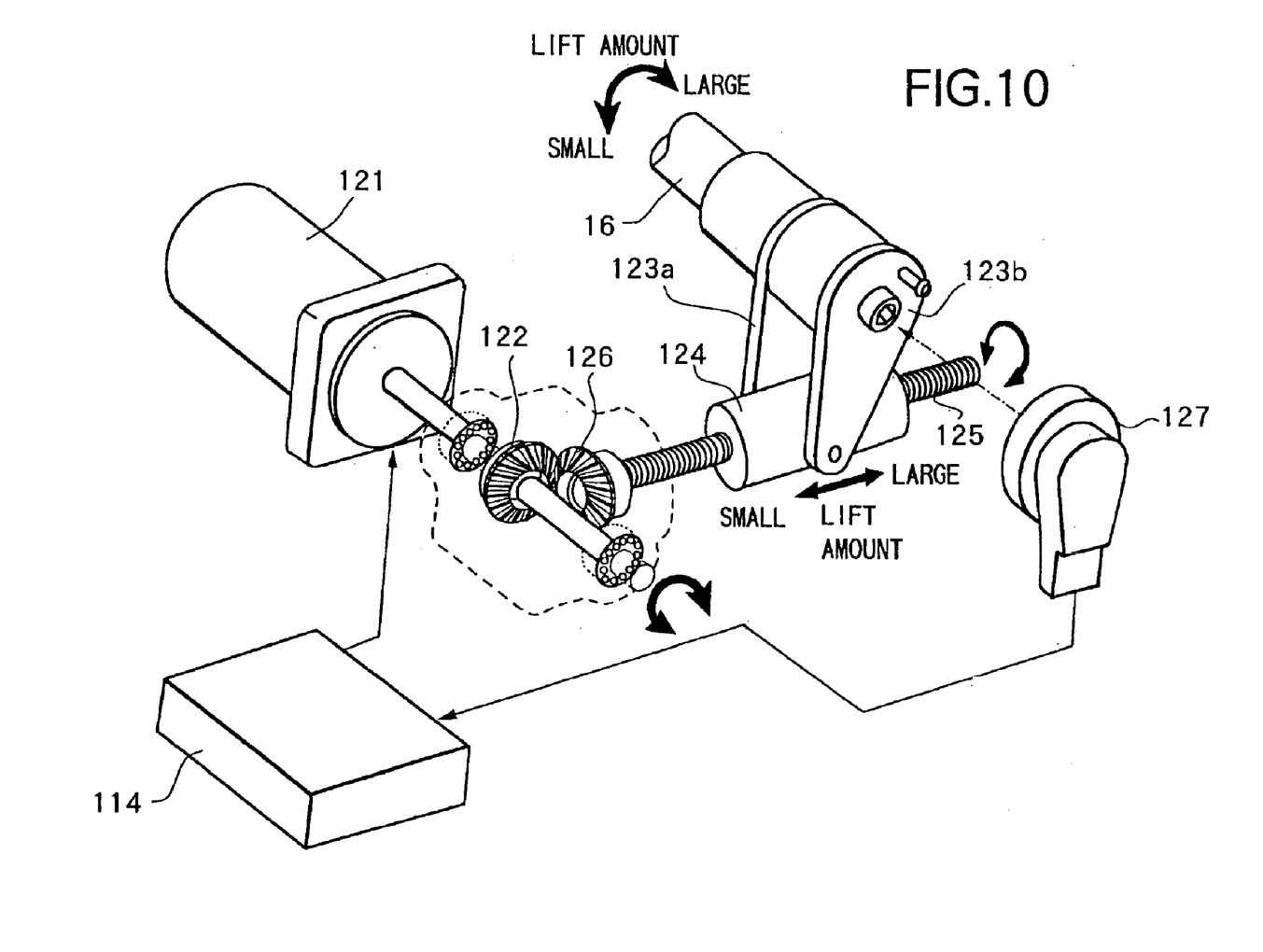
FIG. 10 is a perspective view showing a rotational driving mechanism of a control shaft in the variable valve event and lift mechanism.

Control shaft 16 is driven to rotate within a predetermined angle range by a DC servo motor (actuator) 121 as shown in FIG. 10. By varying an operating angle of control shaft 16 by DC servo motor 121, the valve lift of each of intake valves 105, 105 is continuously varied, which accompanies a variation of valve operating angle (refer to FIG. 9).

In this embodiment, the larger the operating angle of control shaft 16 becomes, the larger the lift amount of intake valve 105 becomes.

In FIG. 10, DC servo motor 121 is arranged so that the rotation shaft thereof is parallel to control shaft 16, and a bevel gear 122 is axially supported by the tip portion of the rotation shaft.

On the other hand, a pair of stays 123a, 123b are fixed to the tip end of control shaft 16. A nut 124 is swingingly supported around an axis parallel to control shaft 16 connecting the tip portions of the pair of says 123a, 123b.

A bevel gear 126 meshed with bevel gear 122 is axially supported at the tip end of a threaded rod 125 engaged with nut 124. Threaded rod 126 is rotated by the rotation of DC servo motor 121, and the position of nut 124 engaged with threaded rod 125 is displaced in an axial direction of threaded rod 125, so that control shaft 16 is rotated.

Here, the valve lift is decreased as the position of nut 124 approaches bevel gear 126, while the valve lift is increased as the position of nut 124 gets away from bevel gear 126.

Further, a potentiometer type operating angle sensor 127 detecting the operating angle of control shaft 16 is disposed on the tip end of control shaft 16, as shown in FIG. 10. Control unit 114 feedback controls DC servo motor (actuator) 121 so that an actual operating angle detected by operating angle sensor 127 coincides with a target operating angle.

The above described controlling function by control unit 114, and variable valve event and lift mechanism 112 of the above construction constitutes a variable valve event and lift control apparatus.

Figure 11:
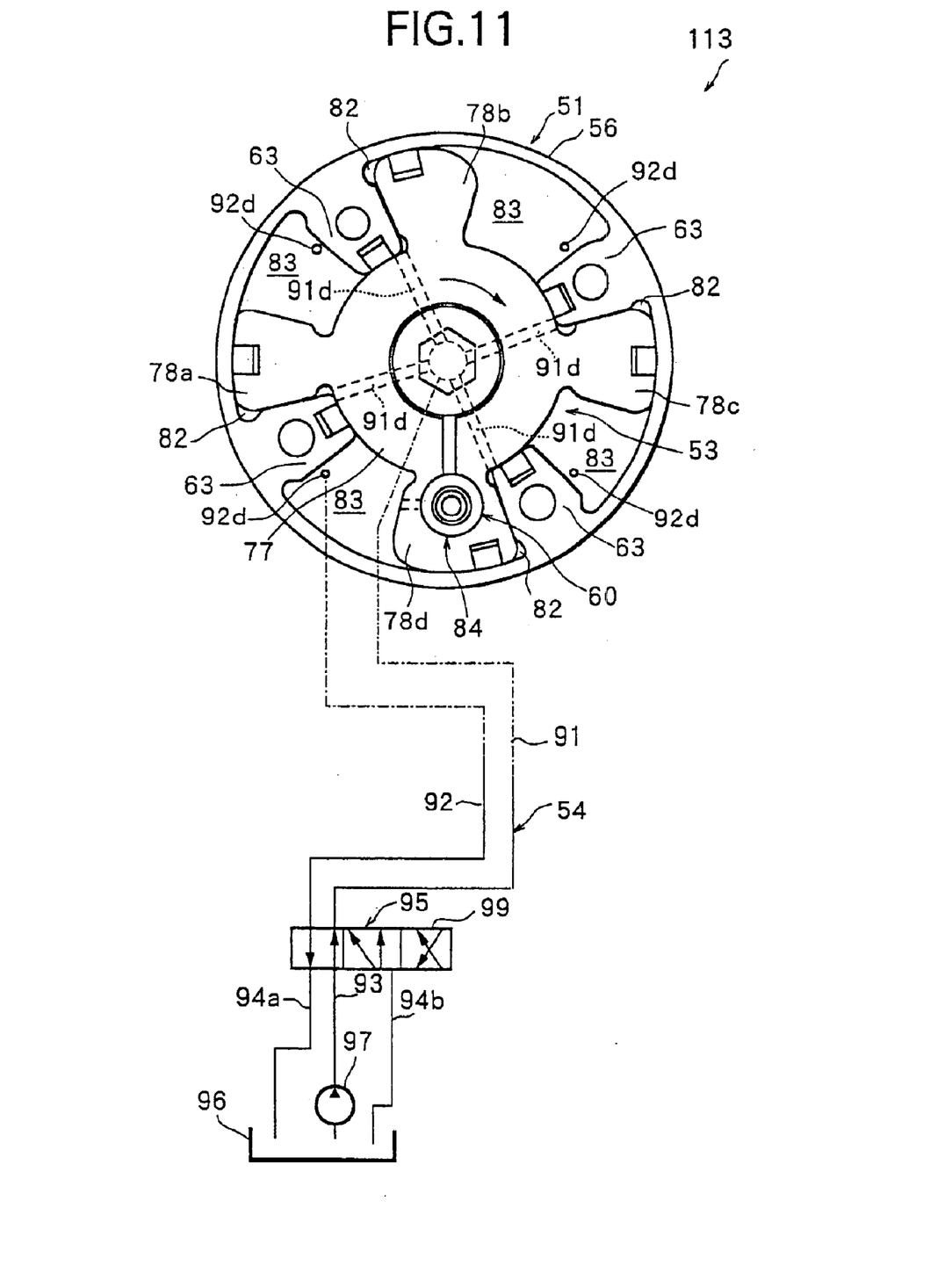
FIG. 11 is a longitudinal cross section view of a variable valve timing mechanism in the embodiment.

Next, the structure of variable valve timing mechanism 113 will be described based on FIG. 11.

Variable valve timing mechanism 113 in the present embodiment is a so-called vane type variable valve timing mechanism, and comprises: a cam sprocket 51 timing sprocket) which is rotatably driven by a crankshaft 120 via a timing chain; a rotation member 53 secured to an end portion of an intake side camshaft 13 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical, shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of camshaft and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. An advance angle side hydraulic chambers 82 and a retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 92 for supplying and discharging oil pressure with respect to retarded angle side hydraulic, chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 98a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control the switching between respective oil pressure passes 91 and 92, and supply passage 93 and drain passages 94a and 94b.

Engine control unit 114 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from first drain passage 94a via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that a valve opening period is delayed relative to a rotation phase angle of crankshaft.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged to oil pan 96 via second oil pressure passage 92, and second drain passage 94b, so that retarded angle side hydraulic chambers 83 become a low pressure.

Therefore, rotation member 53 is rotated to the full to the advance angle side by means of vanes 78a to 78d. Due to this, the opening period of intake valve 105 is advanced relative to the rotation phase angle of crankshaft.

Engine control unit 114 feedback controls a power supply amount to electromagnetic actuator 99 that drives electromagnetic switching valve 95, so that an advance value of valve timing detected based on detection signals from crank angle sensor 117 and cam sensor 129 coincides with target.

The above described controlling function by control unit 114, and variable valve timing mechanism 113 of the above construction constitute a variable valve timing control apparatus.

In the present embodiment, engine control unit 114 controls electronically controlled throttle 104, variable valve event and lift mechanism 112 and variable valve timing mechanism 113, so that the target intake air amount can be obtained.

Figure 12:
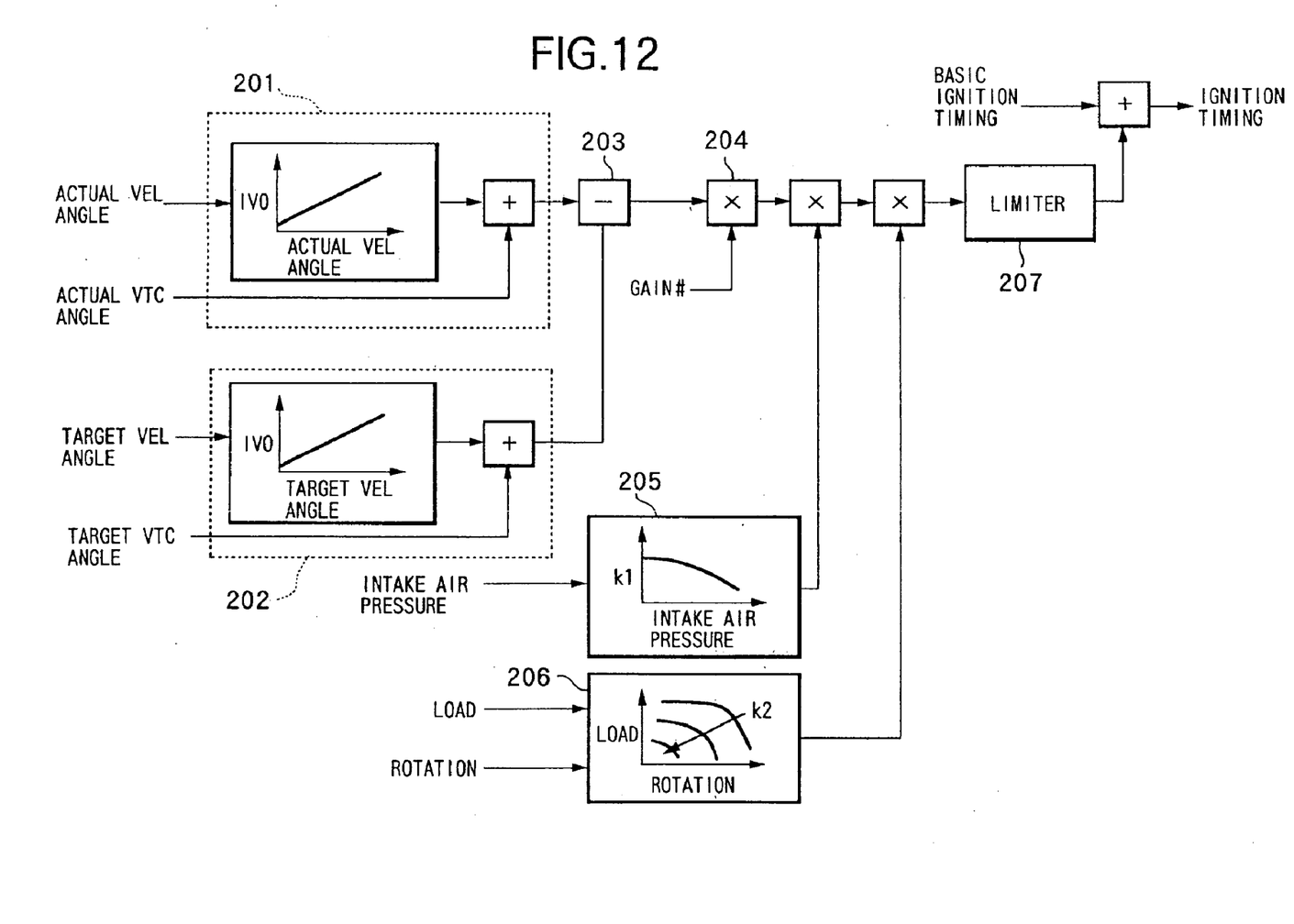
FIG. 12 is a control block diagram showing an ignition timing control in the embodiment.

Further, engine control unit 114 controls the ignition timing (ignition advance value) as shown in a block diagram of FIG. 12.

In the block diagram of FIG. 12, an actual IVO calculating section 201 is input with an actual operating angle of control shaft 16 detected by operating angle sensor 127, and the advance value of valve timing detected based on detection signals from crank angle sensor 117 and cam sensor 129.

The actual operating angle of control shaft 16 corresponds to a controlled variable of the variable valve event and lift control apparatus, and the advance value of valve timing corresponds to a controlled variable of the variable valve timing control apparatus.

In the actual IVO calculating section 201, opening timing IVO of intake valve 105 of when the advance value of valve timing is 0 (most retarded position) is obtained from the actual operating angle of control shaft 16, and the advance value of valve timing is added to the opening timing IVO, to calculate actual opening timing IVO of intake valve 105.

On the contrary, a target IVO calculating section 202 is input with the target operating angle of control shaft 16 and a target advance value of valve timing.

The target operating angle of control shaft 16 is a target of the variable valve event and lift control apparatus, and the target advance value of valve timing is a target of the variable valve timing control apparatus.

In the target IVO calculating section 202, opening timing IVO of intake valve 105 of when the advance value of valve timing is 0 (most retarded position) is obtained from the target operating angle of control shaft 16, and the target advance value of valve timing is added to the opening timing IVO, to calculate target opening timing IVO of intake valve 105.

An IVO deviation amount calculating section 203 calculates a deviation $\Delta$IVO between the actual opening timing IVO and the target opening timing IVO of intake valve 105.

In a basic correction value calculating section 204, the deviation $\Delta$IVO is multiplied by a gain GAIN#, to calculate a basic correction value $\Delta$ADV of ignition timing ADV.

The basic correction value $\Delta$ADV corrects the ignition timing ADV to an advance side if the actual opening timing IVO is in advance of the target opening timing IVO, while correcting the ignition timing ADV to a retarded side if the actual opening timing IVO is in retard of the target opening timing IVO.

Further, a first correction value calculating section 205 calculates a first correction value k1 for correcting the basic correction value $\Delta$ADV, based on the intake air pressure detected by intake air pressure sensor 134.

The first correction value k1 is set so as to correct the basic correction value $\Delta$ADV to be smaller, as the intake air pressure is closer to the atmospheric pressure.

A second correction value calculating section 206 refers to a map previously storing a second correction value k2 according to an engine load and the engine rotation speed, to retrieve the second correction value k2 for correcting the basic correction value $\Delta$ADV.

The second correction value k2 is set so as to correct the basic correction value $\Delta$ADV to be smaller on a high load/high rotation side.

The correction values k1 and k2 are multiplied on the basic correction value $\Delta$ADV, respectively, and multiplication results are input to a limiter section 207.

Limiter section 207 limits the correction value $\Delta$ADV to a predetermined range (for example, within $\pm 10°$, and outputs a limitation result as a final correction value $\Delta$ADV.

The final correction value $\Delta$ADV is added to basic ignition timing ADV set according to the engine load and the engine rotation speed, and an addition result is set as final ignition timing ADV.

Then, engine control unit 114 controls ON/OFF of the power transistor incorporated in ignition coil 133, so that the spark ignition is performed at the final ignition timing ADV.

According to the above constitution, even if there is caused a deviation between a target operating characteristic and an actual operating characteristic during a transition period where the valve lift and valve timing of intake valve 105 by variable valve event and lift mechanism 112 and variable valve timing mechanism 113 are switched, leading a deviation of the opening timing IVO of intake valve 105 from the target opening timing IVO, it is possible to correct the basic ignition timing set corresponding to the target opening timing IVO to ignition timing corresponding to actual opening timing IVO (actual overlap amount).

Consequently, during the transition period of valve lift and valve timing, it is possible to perform the ignition at appropriate ignition timing, to thereby improve operating performance of the engine.

Note, either or both corrected values k1 and k1 may be omitted.

The entire contents of Japanese Patent Application No. 2001-399819 filed Dec. 28, 2001, a priority of which is claimed, are incorporated herein by reference.

While only selected embodiment has been chosen to illustrate the present invention, it will be apparent to those skilled in the art from this disclosure that various changes and modifications can be made herein without departing from the scope of the invention as defined in the appended claims.

Furthermore, the foregoing descriptions of the embodiment according to the present invention are provided for illustration only, and not for the purpose of limiting the invention as defined by the appended claims and their equivalents.

What is claimed are:

1. An ignition timing control apparatus for an internal combustion engine provided with a variable valve event and lift control apparatus that continuously varies a valve lift with a valve event of an intake valve, and a variable valve timing control apparatus that continuously varies valve timing of said intake valve by relatively rotating an intake side camshaft to an intake side cam sprocket, comprising:

an ignition apparatus that combusts an air-fuel mixture inside a combustion chamber of said internal combustion engine; and a control unit controlling ignition timing in said ignition apparatus, wherein said control unit:
is input with a controlled variable and a target in each of said variable valve event and lift control apparatus and said variable valve timing control apparatus;
calculates target opening timing of said intake valve corresponding to said target;
calculates actual opening timing of said intake valve corresponding to said controlled variable;
calculates a deviation between said target opening timing and said actual opening timing; and
corrects said ignition timing based on said deviation.

2. An ignition timing control apparatus for an internal combustion engine according to claim 1, further comprising;
an intake air pressure detector detecting an intake air pressure of said internal combustion engine,
wherein said control unit;
corrects said ignition timing based on said deviation and said intake air pressure.

3. An ignition timing control apparatus for an internal combustion engine according to claim 1, further comprising;
a load detector detecting a load of said internal combustion engine and a rotation speed detector detecting a rotation speed of said internal combustion engine,
wherein said control unit;
corrects said ignition timing based on said deviation, said engine rotation speed and said engine load.

4. An ignition timing control apparatus for an internal combustion engine according to claim 1, further comprising;
an intake air pressure detector detecting an intake air pressure of said internal combustion engine, a load detector detecting a load of said internal combustion engine and a rotation speed detector detecting a rotation speed of said internal combustion engine,
wherein said control unit;
corrects said ignition timing based on said deviation, said intake air pressure, said engine rotation speed and said engine load.

5. An ignition timing control apparatus for an internal combustion engine according to claim 1,
wherein said control unit;
corrects said ignition timing to an advance side when said actual opening timing is in advance of said target opening timing, while correcting said ignition timing to a retarded side when said actual opening timing is in retard of said target opening timing.

6. An ignition timing control apparatus for an internal combustion engine according to claim 1,
wherein said control unit;
sets a multiplication result of said deviation and a predetermined value to a correction value of said ignition timing.

7. An ignition timing control apparatus for an internal combustion engine according to claim 1,
wherein said control unit;
limits a correction value of said ignition timing based on said deviation to a predetermined range.

8. An ignition timing control apparatus for an internal combustion engine according to claim 1, further comprising:
an intake air pressure detector detecting an intake air pressure of said internal combustion engine, a load detector detecting a toad of said internal combustion engine and a rotation speed detector detecting a rotation speed of said internal combustion engine,
wherein said control unit:
calculates a basic correction value of said ignition timing based on said deviation;
calculates a first correction value based on said intake air pressure;
calculates a second correction value based on said engine load and said engine rotation speed; and
calculates a correction value of said ignition timing based on said basic correction value, said first correction value and said second correction value.

9. An ignition timing control apparatus for an internal combustion engine provided with a variable valve event and lift control apparatus that continuously varies a valve lift with a valve event of an intake valve, and a variable valve timing control apparatus that continuously varies valve timing of said intake valve by relatively rotating an intake side camshaft to an intake side cam sprocket, comprising:
ignition means for combusting an air-fuel mixture inside a combustion chamber of said internal combustion engine;
engine operating condition detecting means for detecting engine operating conditions;
basic ignition timing calculating means for calculating basic ignition timing of said ignition means based on said operating conditions;
input means for receiving a controlled variable and a target in each of said variable valve event and lift control apparatus and said variable valve timing control apparatus;
target opening timing calculating means for calculating target opening timing of said intake valve corresponding to said target;
actual opening timing calculating means for calculating actual opening timing of said intake valve corresponding to said controlled variable;
deviation calculating means for calculating a deviation between said target opening timing and said actual opening timing; and
correcting means for correcting said ignition timing based on said deviation.

10. An ignition timing control method for an internal combustion engine provided with a variable valve event and lift control apparatus that continuously varies a valve lift with a valve event of an intake valve, and a variable valve timing control apparatus that continuously varies valve timing of said intake valve by relatively rotating an intake side camshaft to an intake side cam sprocket, comprising the steps of:
detecting engine operating conditions;
calculating basic ignition timing of said ignition means based on said operating conditions;
receiving a controlled variable and a target in each of said variable valve event and lift control apparatus and said variable valve timing control apparatus;
calculating target opening timing of said intake valve corresponding to said target;
calculating actual opening timing of said intake valve corresponding to said controlled variable;
calculating a deviation between said target opening timing and said actual opening timing; and
correcting said ignition timing based on said deviation.

11. An ignition timing control method for an internal combustion engine according to claim 10,
wherein said step of correcting the basic ignition timing comprises the steps of:

detecting an intake air pressure of said internal combustion engine; and correcting said basic ignition timing based on said deviation and said intake air pressure.

12. An ignition timing control method for an internal combustion engine according to claim 10, wherein said step of correcting the basic ignition timing comprises the steps of:

detecting a load of said internal combustion engine;

detecting a rotation speed of said internal combustion engine; and correcting said basic ignition timing based on said deviation, said engine rotation speed and said engine load.

13. An ignition timing control method for an internal combustion engine according to claim 10, wherein said step of correcting the basic ignition timing comprises the steps of:

detecting an intake air pressure of said internal combustion engine;

detecting a load of said internal combustion engine;

detecting a rotation speed of said internal combustion engine; and correcting said basic ignition timing based on said deviation, said intake air pressure, said engine rotation speed and said engine load.

14. An ignition timing control method for an internal combustion engine according to claim 10, wherein said step of correcting the basic ignition timing comprises the steps of:

correcting said basic ignition timing to be advanced when said actual opening timing is in advance of said target opening timing; and correcting said basic ignition timing to be retarded when said actual opening timing is in retard of said target opening timing.

15. An ignition timing control method for an internal combustion engine according to claim 10, wherein said step of correcting the basic ignition timing comprises the steps of:

multiplying said deviation and a predetermined value; and setting a multiplication result of said deviation and said predetermined value to a correction value of said basic ignition timing.

16. An ignition timing control method for an internal combustion engine according to claim 10, wherein said step of correcting the basic ignition timing comprises the steps of:

calculating a correction value of said basic ignition timing based on said deviation; and limiting said correction value to a predetermined range.

17. An ignition timing control method for an internal combustion engine according to claim 10, wherein said step of correcting the basic ignition timing comprises the steps of:

detecting an intake air pressure of said internal combustion engine;

detecting a load of said internal combustion engine;

detecting a rotation speed of said internal combustion engine;

calculating a basic correction value of said basic ignition timing based on said deviation;

calculating a first correction value based on said intake air pressure;

calculating a second correction value based on said engine load and said engine rotation speed; and calculating a correction value of said basic ignition timing based on said basic correction value, said first correction value and said second correction value.

* * * * *